Patented Oct. 4, 1932

1,880,372

UNITED STATES PATENT OFFICE

ARTHUR W. BULL, OF NAUGATUCK, CONNECTICUT, ASSIGNOR TO RUBBER REGENERATING COMPANY, OF NEW HAVEN, CONNECTICUT, A CORPORATION OF INDIANA

PROCESS OF RECLAIMING VULCANIZED RUBBER FIBER PRODUCTS

No Drawing.   Application filed October 2, 1929.   Serial No. 396,934.

This invention relates to the art of reclaiming rubber, and particularly to that process in the art which concerns the separation of vulcanized rubber from fibrous material. Particularly the invention is applicable to tire casings and similar rubber fiber products.

Heretofore in the art of separating vulcanized rubber-fiber material it has been customary first to treat the rubber in a manner to partially devulcanize it or otherwise to soften or swell it by treatment with organic solvents. Such a process is disclosed in the patent to Furness No. 1,321,200, Nov. 11, 1919. Processes such as that disclosed in the Furness patent depend upon softening and rendering the rubber tacky so that the rubber may form aggregates during the process of separation, which amalgamation or aggregation is necessary to the success of the process.

It is the object of this invention to provide a process for mechanically effecting the separation of rubber and fiber from a vulcanized rubber-fiber product in which the rubber remains in the vulcanized state throughout the process of separation. It is also the object of this invention to provide a process for separating vulcanized rubber-fiber products in which the rubber particles are not amalgamated but are extracted in the form of particles or small pieces. Another object of this invention is to provide a process adapted to separate the rubber and fiber from such products as tire casings and the like. Another object of this invention is to provide a process of separating rubber and fiber from rubber-fiber material in which the cords or threads are unravelled or reduced to the form of individual fibers. It is also an object of this invention to provide a process for mechanically separating rubber fiber products in the presence of water in which the rubber is partially extracted by settling in the water.

Other objects and advantages of the present invention will appear in the following detailed description.

The vulcanized rubber-fiber product to be reclaimed, such as a tire casing, is first ground or cracked in any suitable sort of mill into the form of pieces of a size convenient for handling in the subsequent steps of the process. In the grinding operation a considerable amount of rubber is loosened or freed from the fiber. The smaller particles of rubber which have been freed from the product by the grinding operation are then separated, preferably by screening or sifting the ground product on a screen of suitable mesh.

The ground product remaining at the end of the screening operation is then saturated with water preferably by placing it in a suitable beater or wet grinding machine of any usual type such as that used in the paper industry for beating. The product is then subjected to the beating action of the machine which acts to strip off the rubber from the fiber or fabric and also acts to reduce the cords or threads to the individual fibers. If desired the beater may be provided with washing screens or cylinders to cleanse the fiber while the beating is carried on, and, if desired soap may be added to the water to aid in cleansing the fibers. During the beating operation, many of the pieces of vulcanized rubber which are stripped off the fiber, and which have a density greater than that of water, settle to the bottom of the machine which may be provided with any suitable sort of trap for accumulating the rubber as it settles. Conveniently the rubber is removed continuously from the trap by any suitable sort of conveyor such as a screw.

When the adhesion between the rubber and the fibrous material has been destroyed by the beating operation, the mixture of fibers and pieces of rubber mechanically held in the mass of fibers is removed from the beating machine and excess water removed therefrom by any suitable sort of machine such as a centrifuge. The moist mass of fibers and rubber particles is then dried in any suitable manner. If desired the step of dewatering or centrifuging may be eliminated and all water removed during the drying operation.

The dried mass of fibers and rubber particles is then loosened or opened up by any suitable machine such as a picker of any usual type and the picked mass of fibers and rubber particles is then separated into its constituent fibers and rubber. The separation is effected by any suitable sort of machine such as a burr remover of the type employed for removing burrs from wool. Other suitable machines of that type may be employed for separating the remaining vulcanized rubber from the mass of fibers.

The mass of fibers entirely freed of rubber is then ready for baling and sale for reuse as reclaimed fiber. The rubber extracted at the three different steps of screening, beating and the last mentioned steps of picking is treated in any suitable way to devulcanize it or otherwise render it useful in rubber manufacture.

If a washing screen or cylinder is used during the beating operation, some finely divided rubber will pass through the screen with the wash water. This may be recovered by filtration through a finer screen or by settlement in a suitable tank.

It is seen that according to the process of this invention the vulcanized rubber fabric product is not treated to any devulcanization process which would injure the fiber. Furthermore by removing the rubber from the fiber in the form of small pieces it is in the form most convenient for further treatment such as devulcanization. It has been found in the actual practice of this invention that the resulting rubber and resulting fiber are higher grade products than those obtained by separating the rubber and fiber according to any other known process.

While the process has been described in detail by way of illustration, it is not intended so to limit the invention inasmuch as the details of the process may be varied without departing from the invention as will be evident to one skilled in the art, and for an understanding of the scope of the invention reference is made to the following claims.

Having thus described my invention, what I claim and desire to protect by Letters Patent is:

1. That process of separating the vulcanized rubber and the fiber from vulcanized rubber fiber products which consists in breaking the product into small pieces, separating the smaller particles of free rubber from the broken down product, mechanically destroying the adhesion between the fiber and the remaining vulcanized rubber in the presence of water, segregating and removing free pieces of rubber by settling of the rubber in the water, drying the residue of mixed fiber and rubber, and separating the remaining vulcanized rubber from the fiber.

2. That process of separating the vulcanized rubber and the fiber from vulcanized rubber fiber products which consists in grinding the product into small pieces, extracting the smaller particles of rubber freed from the fiber by grinding, beating the ground product in the presence of water, extracting the pieces of vulcanized rubber freed by beating, drying the remaining rubber and fiber, picking the dry fiber and rubber, and extracting the remaining vulcanized rubber from the fiber.

3. That process of separating the vulcanized rubber and the fiber from vulcanized rubber fiber products which consists in grinding the vulcanized product into small pieces, sifting the ground product to remove the smaller particles of rubber freed by grinding, saturating the ground product with water, simultaneously mechanically destroying the adhesion between the fiber and the remaining vulcanized rubber and mechanically reducing the fibrous material to fibers, extracting free pieces of vulcanized rubber by allowing them to settle in the water, drying the remaining mixture of rubber and fiber, and removing the rubber from the dried mixture.

4. That process of separating the vulcanized rubber and the fiber from vulcanized rubber fiber products which consists in grinding the vulcanized product into small pieces, sifting the ground product to remove the smaller particles of rubber freed by grinding, saturating the ground product in water, simultaneously mechanically destroying the adhesion between the fiber and the remaining vulcanized rubber and mechanically reducing the fibrous material to fibers, extracting free pieces of vulcanized rubber by allowing them to settle in the water, removing excess moisture from the remaining mixture of rubber and fiber, drying the remaining mixture of rubber and fiber, and removing the rubber from the dried mixture.

5. That process of separating the vulcanized rubber and the fiber from vulcanized rubber fiber products which consists in grinding the vulcanized product into small pieces, sifting the ground product to remove the smaller particles of rubber freed by grinding, saturating the ground product in water, simultaneously mechanically destroying the adhesion between the fiber and the remaining vulcanized rubber and mechanically reducing the fibrous material to fibers, extracting free pieces of vulcanized rubber by allowing them to settle in the water, drying the remaining mixture of rubber and fibers, picking the dried mixture of rubber and fiber, and removing the rubber from the dried mixture.

6. That process of separating the vulcanized rubber and the fiber from vulcanized rubber fiber products which consists in grinding the vulcanized product into small pieces, sifting the ground product to remove the smaller particles of rubber freed by grinding, saturating the ground product in water, simultaneously mechanically destroying the adhesion between the fiber and the remaining vulcanized rubber and mechanically reducing the fibrous material to fibers, extracting free pieces of vulcanized rubber by allowing them to settle in the water, removing excess moisture from the remaining mixture of rubber and fiber, drying the remaining mixture of rubber and fiber, picking the dried mixture of rubber and fiber, and removing the rubber from the dried mixture.

7. That process of separating the vulcanized rubber and the fiber from vulcanized rubber fiber products which consists in grinding the vulcanized rubber fiber product into small pieces, sifting the ground product to remove the vulcanized rubber freed by grinding, saturating the ground product with water, beating the ground product in the presence of water so as to separate the rubber and fibrous material and to reduce the fibrous material to fibers, effecting the separation of free rubber pieces by the settling of the rubber pieces in the water, dewatering the remaining mixture of rubber and fiber to remove excess moisture, drying the mixture of rubber and fiber, picking the dried mixture, and extracting the rubber from the fiber.

8. That process of separating the vulcanized rubber and the fiber from vulcanized rubber fiber products which consists in breaking the product into small pieces, mechanically destroying the adhesion between the fiber and the remaining vulcanized rubber in the presence of water, segregating and removing free pieces of rubber by settling of the rubber in the water, drying the residue of mixed fiber and rubber, and separating the remaining vulcanized rubber from the fiber.

Signed at Naugatuck, county of New Haven, State of Connecticut, this 30th day of September, 1929.

ARTHUR W. BULL.